United States Patent [19]

Ballinger et al.

[11] Patent Number: 5,047,873

[45] Date of Patent: Sep. 10, 1991

[54] SPLIT SWIPE TAPE RECORDING

[75] Inventors: Dale O. Ballinger, Lakewood; Daniel Soo, Sedalia, both of Colo.

[73] Assignee: Honeywell Inc., Minneapolis, Minn.

[21] Appl. No.: 445,588

[22] Filed: Dec. 4, 1989

[51] Int. Cl.[5] .............................................. G11B 5/02
[52] U.S. Cl. ........................................ 360/22; 360/70
[58] Field of Search ...................... 360/22, 70, 32, 64

[56] References Cited

U.S. PATENT DOCUMENTS

| | | |
|---|---|---|
| Re. 31,078 | 11/1982 | Segerstrom . |
| 3,375,331 | 3/1968 | Okazaki et al. . |
| 4,390,915 | 6/1983 | Matsuyama . |
| 4,731,659 | 3/1988 | Kani . |
| 4,760,471 | 7/1988 | Brush et al. ........................... 360/70 |
| 4,819,089 | 4/1989 | Wilkinson et al. . |
| 4,956,730 | 9/1990 | Arai et al. ............................. 360/70 |
| 4,984,104 | 1/1991 | Takahashi et al. ................... 360/70 |

Primary Examiner—Vincent P. Canney
Attorney, Agent, or Firm—Charles L. Rubow

[57] ABSTRACT

An apparatus and a method for reducing cross talk in tape recording and playback systems is disclosed. A single magnetic track containing D data bytes of the prior art is divided into W substracks, each containing D/W data bytes. The tape recorder is capable of recording at a preselected full speed and integral fractions thereof. When recording is done at less than full speed, the W subtracks which comprise a track are offset longitudinally, such that the area covered by the W subtracks approximates the area of a single track of the prior art recorded at full speed. To further suppress cross talk, wide write heads and narrow read heads, or opposite azimuth angle heads may be used.

17 Claims, 7 Drawing Sheets

SPLIT SWIPE TAPE RECORDING

BACKGROUND OF THE INVENTION

This invention is directed toward the field of helical scan tape recorders. More specifically, the invention is an apparatus and a method for avoiding cross talk which may occur with such apparatus when a magnetic tape is recorded at one speed and played back at a different speed.

Devices which record and read magnetic tracks on a magnetic tape are well known in the art. Particularly well known are the devices and methods by which many parallel magnetic "tracks" representative of information are placed on and read from a magnetic tape. The magnetic tracks are recorded transversely to the direction of travel of the tape and continue in a side by side relationship along the full length of the tape.

To create the tracks on the tape, a magnetic head mounted on a rapidly rotating drum passes transversely to and in close proximity to the relatively slowly moving tape wrapped around said drum. The recorder produces a variable magnetic field in an air gap formed in the head. The magnetic field, in turn, creates the magnetic tracks on the tape. To play back the tape, a head is once again passed transversely across the tape in the same path as the track of the head upon recording. The magnetic track induces a voltage in the head.

A problem inherent in this method of operation is that when the tape speed is changed and the drum speed remains fixed, the angle at which the head transversely crosses the tape is changed. If, on playback, the tape speed is different from the tape speed at which the tape was recorded, a head sensing the tracks passes over more than one track on the tape. This "cross talk", in the case of video tape recorders for example, results in a distorted picture on the display. In the case of data storage, data error would occur as a result of the cross talk.

Many methods and devices have been invented to try to maximize the signal to cross talk ratio. Inventions such as disclosed in U.S. Pat. No. 4,731,659 issued to Kanni, attempt to eliminate cross talk by repositioning the head in order to compensate for the different head track angles during recording and playback. Another well known method, disclosed in U.S. Pat. No. 3,375,331 issued to Okazaki et al., is to dynamically reposition the tape in relationship with tape speed. A further well known method to limit cross talk is the introduction of an empty guardband between adjacent tracks as shown in U.S. Pat. No. Re. 31,078 issued to Segerstrom. However, all of these methods are not completely successful in eliminating cross talk. Furthermore, all of the methods require either mechanical movement of the head or substantially decreasing tape track density.

Thus it is an object of the present invention to provide a method and system for recording and playing back of a magnetic tape so that there is no cross talk during the playback of the magnetic tape. It is a further object of the present invention to provide a system and a method for substantially cross talk free playback such that track density is not substantially reduced, and dynamic repositioning of the heads and/or magnetic tape is not necessary.

SUMMARY OF THE INVENTION

The present invention is a tape recorder and method of recording wherein a full recorded track of the prior art is split into a plurality of subtracks, with the subtracks of one track being offset when being recorded at any integral fractional of full speed. A full speed recorded track is used as a reference to which the multiple subtracks are to approximate. The recorder has a plurality of recording heads being carried on a rotary scanner. The rotary scanner has a high rotational rate and is positioned so that the heads pass transversely and in close proximity to the magnetic tape. The selection of a head to record a subtrack on the tape is then based on tape speed and is performed by a logic device inside the recorder. The logic device is programmed so that the heads selected to record, record the subtracks so that the plurality of subtracks which make up a single track are recorded on substantially the same area of the tape that a single track at full tape speed would have covered.

BRIEF DESCRIPTION OF THE DRAWINGS

FIG. 7b illustrates the increased coincidence of tracks recorded at different speeds with apparatus in accordance with the present invention operating at approximately the same drum speed and a lesser tape speed as in the prior art of FIG. 7a.

DETAILED DESCRIPTION

Figure 1:
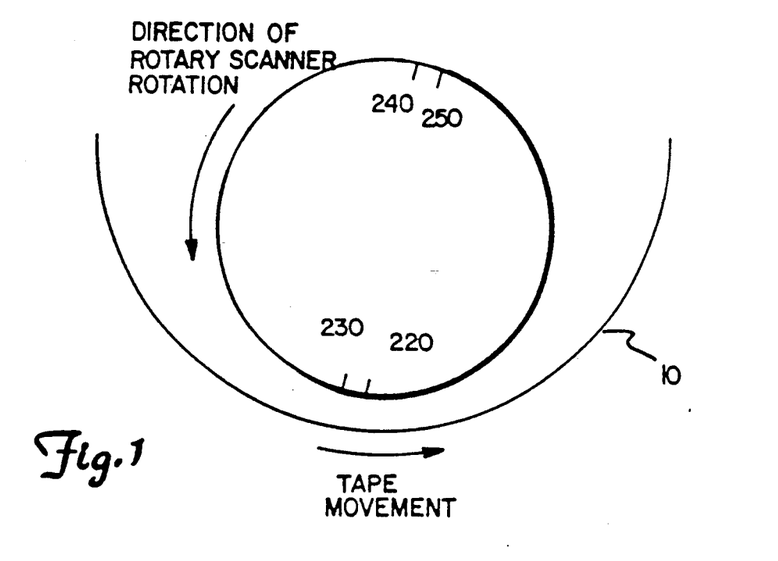
FIG. 1 shows the relationship between a rotary scanner and a tape.

Turning now to FIG. 1, there shown is the rotary scanner 210 of a tape recording/playback device (not shown). As shown, magnetic tape 10 passes in close proximity to the rotary scanner 210. The rotary scanner 210 carries a plurality of magnetic heads 220, 230, 240 and 250 and rotates with a constant period of rotation, T. For the present embodiment, the rotary scanner rotates at 60 Hz and has a period = 1/60 second. Magnetic heads 220, 230, 240 and 250 may have an electrical signal representative of information impressed upon them. When the heads pass in close proximity to the tape, magnetic tracks (see FIGS. 2 and 3) representative of information, are produced on tape. The magnetic heads 220, 230, 240 and 250 may also be capable of sensing the magnetic tracks on the tape, and producing a signal indicative of the information stored in the magnetic tracks.

Figure 2:
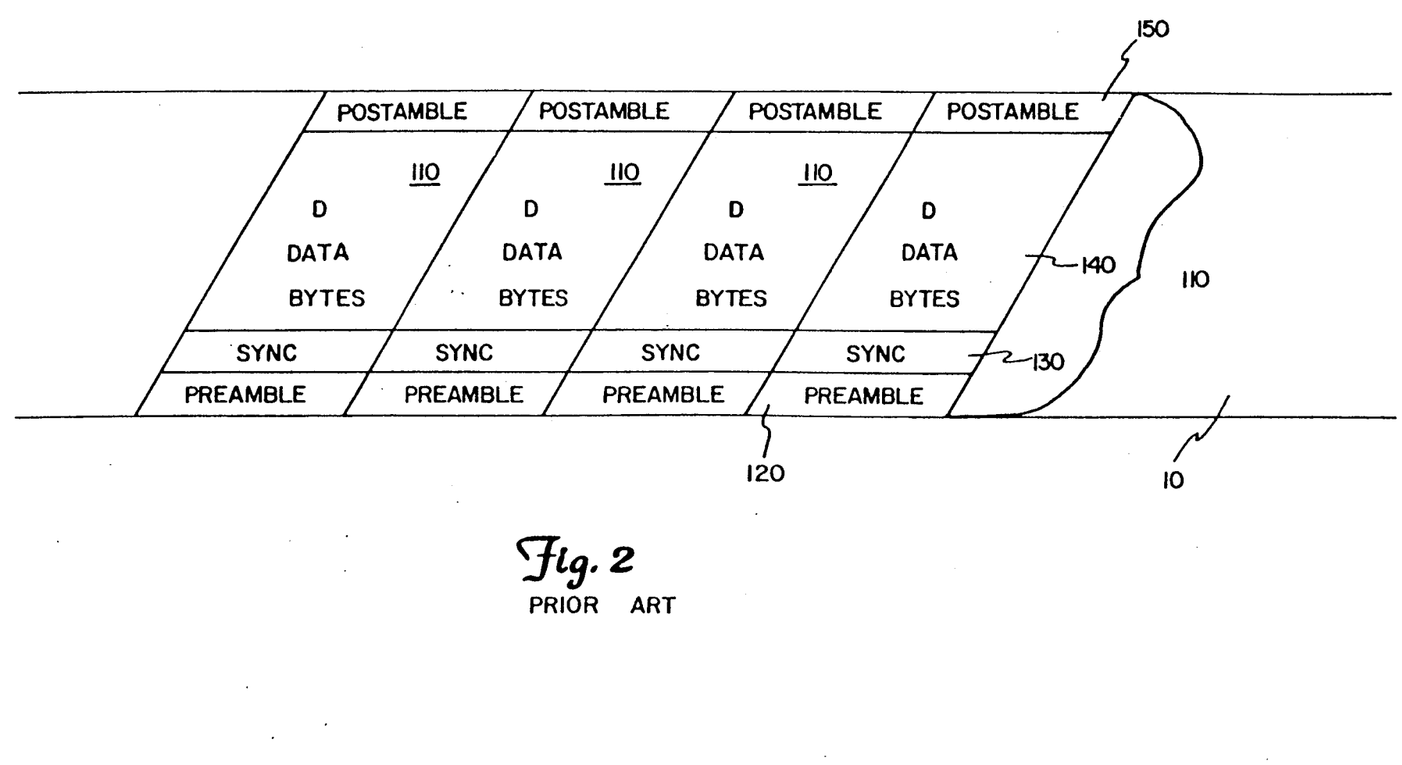
FIG. 2 shows the recorded data tracks of the prior art.

Referring now to FIG. 2, there shown is a representation of a plurality of magnetic tracks 110 as recorded on a magnetic tape 10 using the prior art method. Each magnetic track 110 is further divided into a preamble 120, a sync signal 130, D data bytes 140, where D is an integer, and a postamble 150. The preamble 120 is a non-data region of the track sometimes used optimize system performance. The sync signal 130 is used to signal a signal utilization device (not shown) that the data bytes 140 are going to be sent to the device. Data bytes 140 are signals representative of information. The post amble 150 serves the same function as the preamble 120.

In the prior art, a magnetic track 110 was recorded by one magnetic head, for example magnetic head 220, as it passed transversely across tape 10, thus producing the unitary magnetic tracks 110 as shown in FIG. 2. The present invention is a device for and the method of splitting a magnetic track into two or more subtracks and longitudinally offsetting the subtracks for any recording speed other than full speed as shown in FIGS. 3 through 5b.

Figure 3:
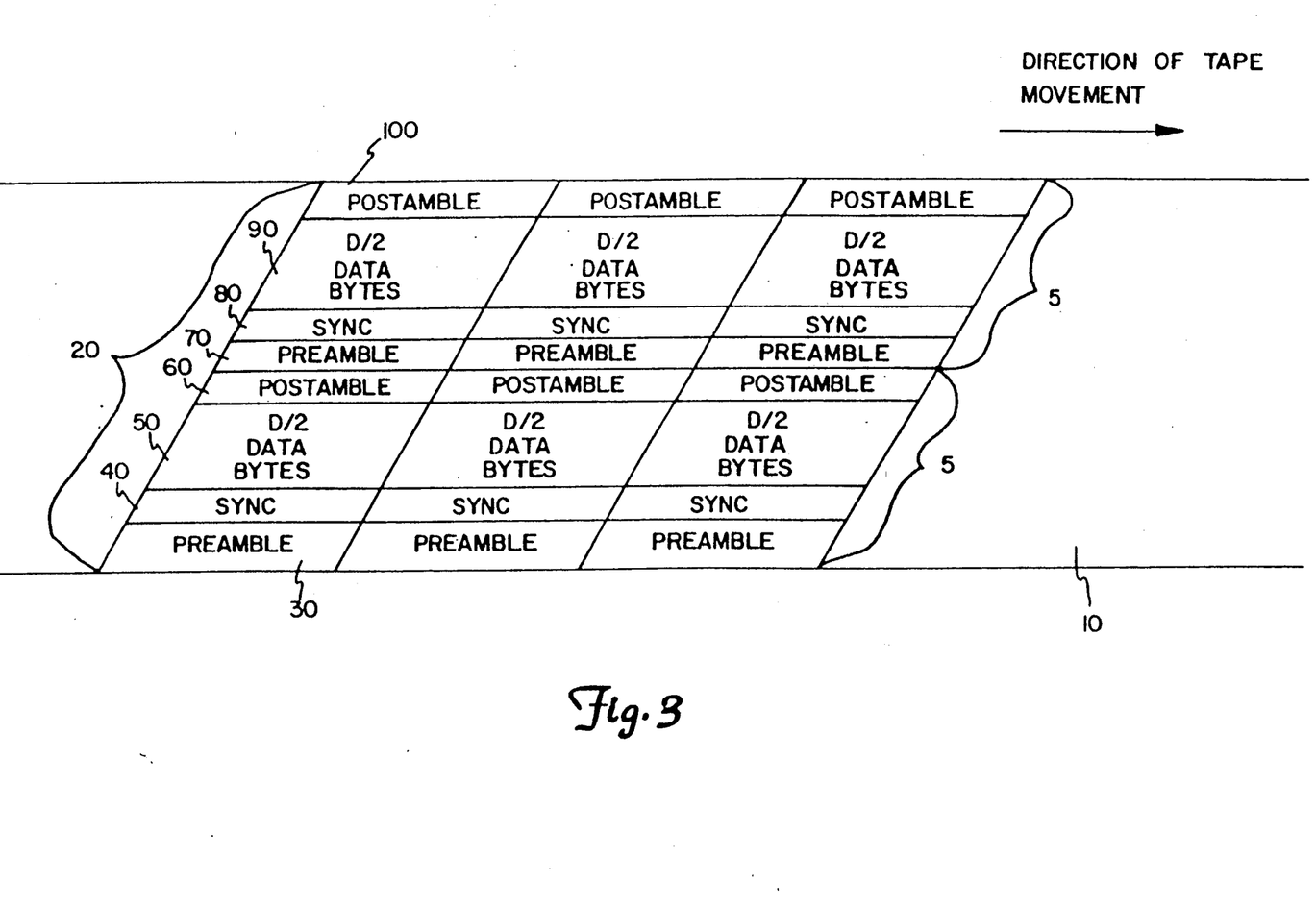
FIG. 3 shows the data tracks and subtracks used in the present invention.

As shown in FIG. 3, magnetic tracks 20 are comprised of W subtracks 5 and containing D/W data bytes, where W is an integer. For FIG. 3, W equals 2. Each magnetic track 20 has two preambles 30, 70, two sync signals 40, 80 and two postambles 60, 100. Further, each subtrack 5 contains only D/2 data bytes 50, 90.

Occasionally, it is desirable to be able to record a tape 10 at one speed and play it back at a different speed. In the prior art systems, cross talk was created due to the different playback and recording speeds. In order to maximize the signal to cross talk ratio, the present invention not only splits a track 20 into two subtracks 5, but for any speed which is an integral fraction of the full tape speed, consecutive subtracks are offset. While the subtracks 5 of FIG. 3 are shown for simplicity in a side by side relationship, some overlap of subtracks may occur depending upon the specific details of the recording device used (see FIGS. 5a and 5b).

Figure 4:
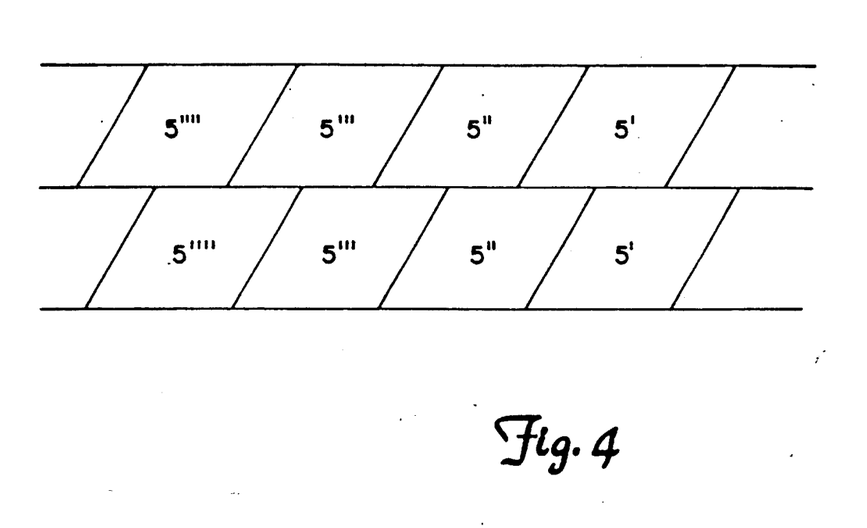
FIG. 4 shows how the subtracks of a track are offset longitudinally for any speed other than full speed.

Referring now to FIG. 4, thereshown is a plurality of magnetic tracks 20 recorded at a tape speed which is an integral fraction of full speed. Full speed for this embodiment is 5 inches per second (IPS). Note that the two subtracks 5 which make up a complete track 20 are offset laterally. The two subtracks forming a track are shown with a like number of prime signs. The amount of offset varies slightly with tape speed but in general is about one third to one half a track width.

In order to further suppress crosstalk, either of two well known methods of recording may also be used, i.e., opposite azimuth angle heads or a wide record head in combination with a narrow read head. These crosstalk suppression methods will be discussed in connection with FIGS. 5a-d.

Figure 5A:
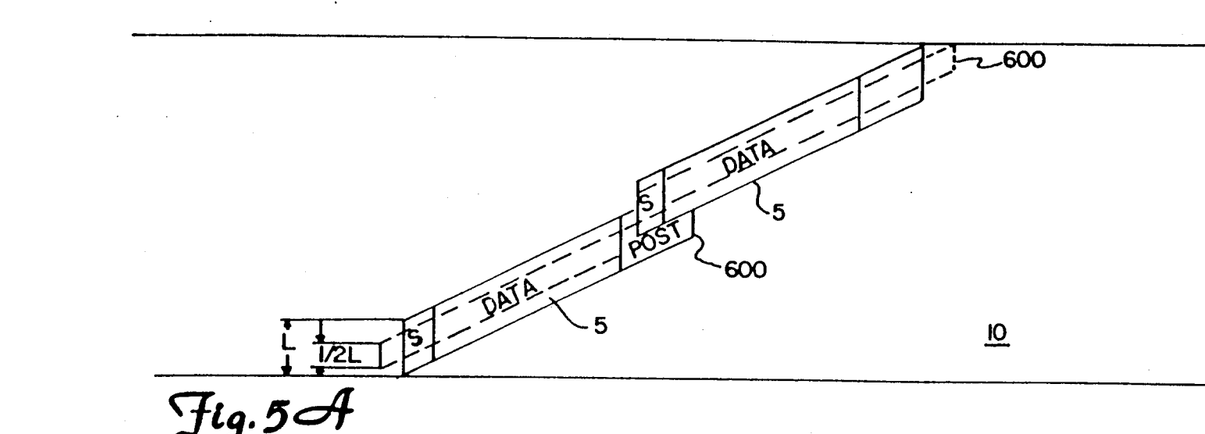
FIG. 5a shows subtracks recorded with wide record head.
Figure 5B:
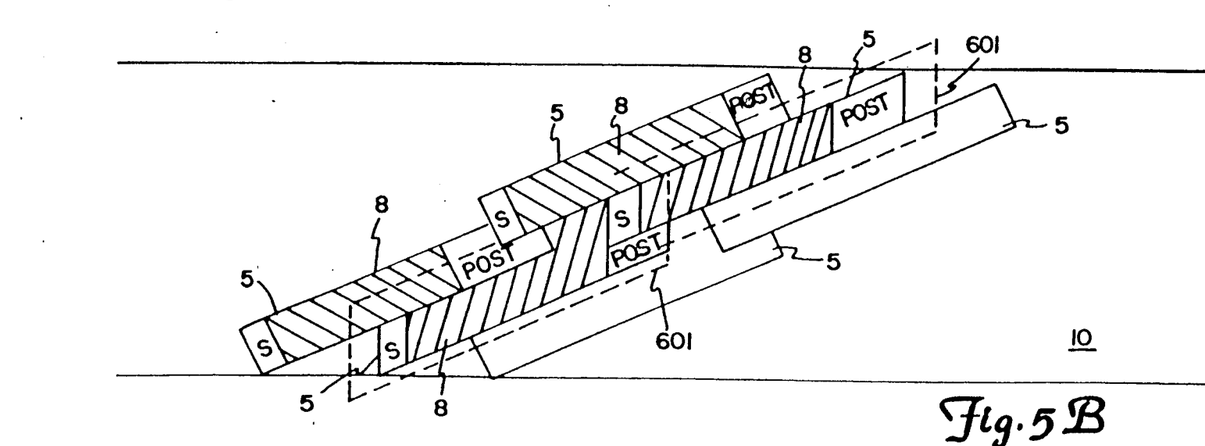
FIG. 5b shows subtracks recorded with heads having opposite azimuth angles.
Figure 5C:
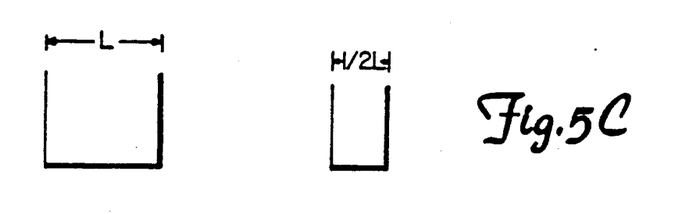
FIGS. 5c and 5d show the heads used to record the subtracks of FIGS. 5a and 5b respectively.

In FIG. 5a, a pair of subtracks 5 have been recorded using a wide record head as shown in FIG. 5c. The subtracks have been recorded at full speed/2. Reproduce swipe 600 represents the path taken by a head in reading the information off the tape at full speed/333. The width L of the recorded subtracks 5 should be approximately twice that of the reproduce swipes 600, although other ratios will also work. The width of the record head is likewise approximately twice the width of the read head, although once again other ratios between the widths will also work. By carefully selecting head width, rotary scanner speed and tape speeds as above, reproduce swipe 600 passes only over the subtrack it intends to read. This avoids crosstalk.

Figure 5D:
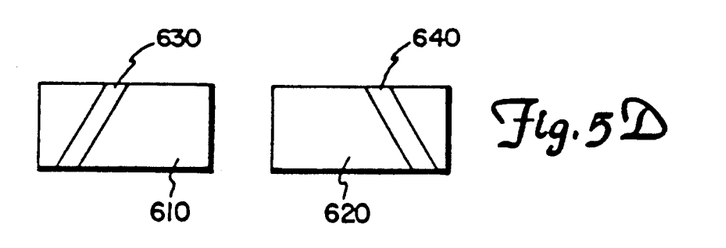

Referring now to FIG. 5b, thereshown are a plurality of subtracks 5 which were recorded with a pair of opposite azimuth angle heads 610, 620 as shown in FIG. 5d. The plurality of lines in data region 8 represents the recorded data bytes. Note that in adjacent subtracks, the lines are at different angles, which are representative of the angles at which the data bytes are recorded on tape. The difference in angles on the tape is due to the difference in angles between air gaps 630 and 640. The subtracks on the tape will be recorded at the same angles on the tape as the air gap which creates the subtracks. By using the opposite azimuth recording heads, a greater data packing density can be achieved.

When the subtracks are to be read from the tape, the same heads 610, 620 are passed over the tape. The head will only pick up data which is at substantially the same angle on the tape as the azimuth angle of the gap in the head. Thus, even through reproduce subswipes 601 pass over more than one subtrack at a time, only the subtrack having data recorded at substantially the same angle as the azimuth angle of the air gap, will be sensed.

Figure 6:
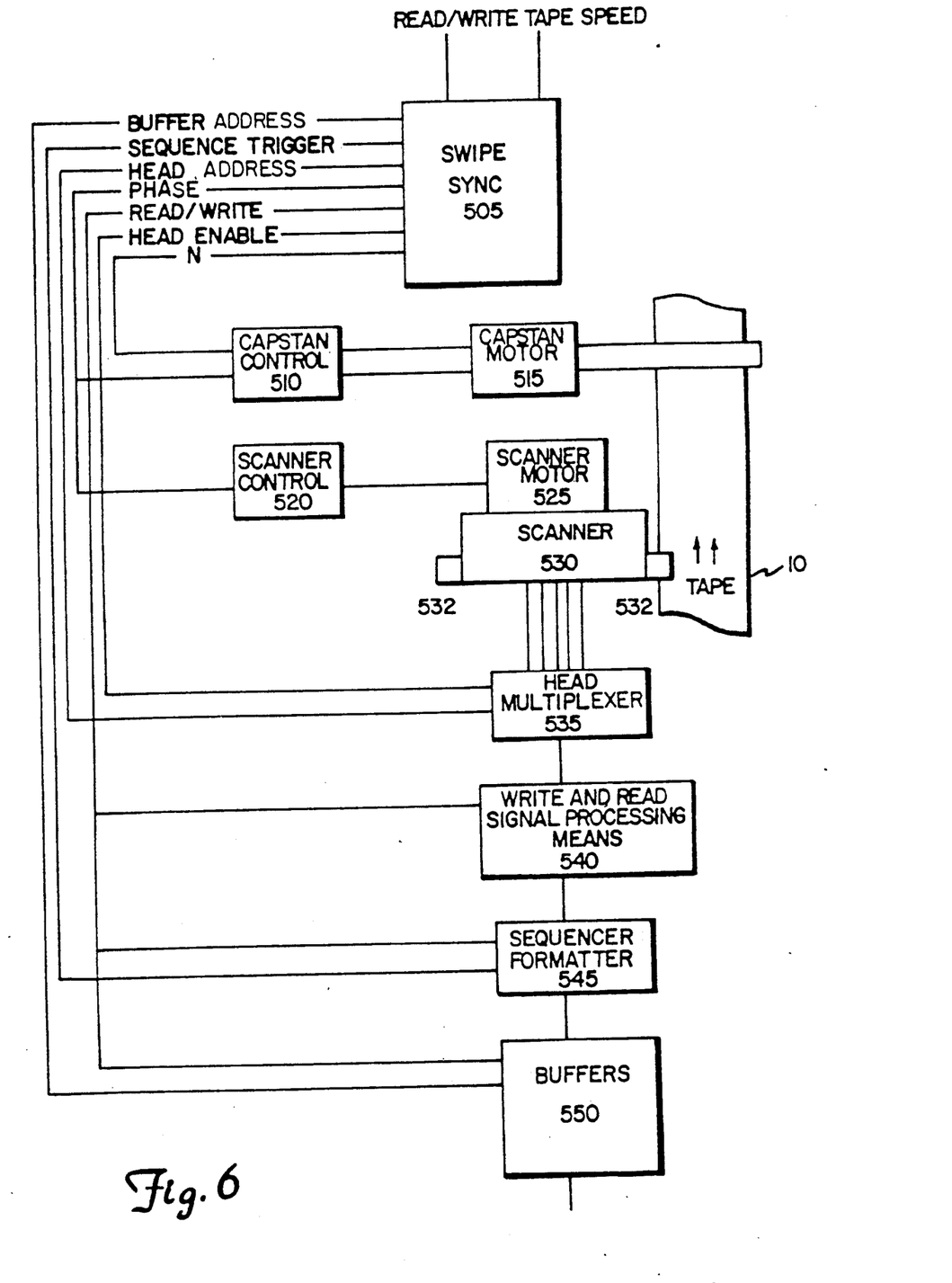
FIG. 6 shows the a system diagram of the present record/playback device.

Shown in FIG. 6 is a block diagram of a tape recorder 500 in accordance with the present invention, comprising a swipe synchronizer 505, a capstan control 510, a capstan motor 515, a rotary scanner control 520, a rotary scanner motor 525, a rotary scanner 530, read and write heads 532, a head multiplexer 535, write and read signal processing means 540, a sequencer-formatter 545 and data buffer means 550. The interrelationship of these parts will now be described.

Swipe synchronizer 505 serves as the timing means for the recorder. The swipe synchronizer receives as inputs, a tape speed signal and a read/write signal. It may be constructed from a programmable array logic (PAL) device. The tape speed signal is representative of tape speed in either the read or write modes of operation while the read/write signal indicates to the swipe synchronizer whether the recorder is to write subtracks on the tape or read subtracks from the tape.

Once the swipe synchronizer 505 receives the tape speed and read/write signals, it produces a buffer address, sequence, trigger, head address, phase, read/write, and N signals. These signals will be described in greater detail hereinafter.

The capstan control 510 and capstan motor 515 work together as a unit to control tape speed. Tape speed is controlled by the operator through the use of a tape speed control (not shown). The tape speed control produces a signal which is sent to the swipe synchronizer 505 and passed on to the capstan control as the N signal. The N signal represents the integral fractional tape speed chosen by the operator. The N signal in combination with the phase signal produced by the swipe synchronizer 505 are passed from the capstan control 510 to the capstan motor 515. The swipe synchronizer serves to coordinate events whose start times (phase) have a definite relationship to one another, as well as having fixed relative speeds.

Rotary scanner control 520, rotary scanner motor 525 and rotary scanner 530 also operate as a unit in order to allow heads 532 to pass across the tape to either record subtracks or reproduce signals from previously recorded subtracks. Rotary scanner control 520 receives the phase signal from swipe synchronizer 505. The rotary scanner control then sends the phase signal to the rotary scanner motor. The rotary scanner speed does not change with a change in tape speed, and for the present embodiment has a frequency of 60 Hz. Rotary scanner motor 525 is physically connected to rotary scanner 530 to cause rotation of the rotary scanner. Heads 532 are physically attached to rotary scanner 530 and rotate with the same frequency as the rotary scanner. The rotary scanner is positioned within the tape recorder so that tape velocity is inclined to the plane of rotation of the rotary scanner.

Head multiplexer 535 is in electrical connection with heads 532. There are two purposes for the head multiplexer. First, when the recorder is in the write mode, the head multiplexer 535 receives from the swipe synchronizer 505 the head address signal which indicates which head is to be used to write the next subtrack on the tape. When the tape recorder is in the read mode, the head multiplexer receives from the swipe synchronizer a head address signal which indicates the head to be selected to send the signal induced therein to a data storage device (not shown). The head enable signal tells the head multiplexer to actually activate the selected read/write head.

Read/write signal processing means 540 may comprise signal amplifiers, equalizers and other devices which improve the quality of the signal recorded and reproduced.

Sequencer-formatter 545 is a device which in the record mode puts signals to be recorded into the proper form for recording on tape. The sequencer-formatter adds the preamble, sync and postamble portions of the signal when the tape recorder is in the write mode. When in the read mode, the sequencer-formatter strips the induced signal of the preamble, sync and postamble portions. The sequencer-formatter 545 receives the read/write signal and sequence trigger signal from the swipe synchronizer 505.

Lastly, data buffer means 550 serves to divide up data to be recorded into smaller groups, and temporarily stores the divided data sequences. Data buffer means 550 receives from a user digital data source a string of data bytes. In the prior art, a string of D data bytes was generally recorded on a tape, the string of D data bytes having a preamble, a sync signal and a postamble added prior to recording (see FIG. 2). In the present apparatus and method of recording, this string of D data bytes is further divided into W smaller strings, each of the W strings having D/W data bytes.

Data buffer means 550 is comprised of at least W buffers having a capacity of at least D/W data bytes each. Obviously, more data buffers may be added to increase the usable speed range of the incoming raw data. The data buffer means is electrically connected with the swipe synchronizer and receives from it the read/write signal and the buffer address signal. The buffer address signal identifies to the data buffer means 550 which buffer is to transfer the data contained therein to the sequencer-formatter and receive information from the data source in the write mode. In the read mode, the buffer address signal identifies which buffer will receive information from the sequencer-formatter 545.

Figure 7A:
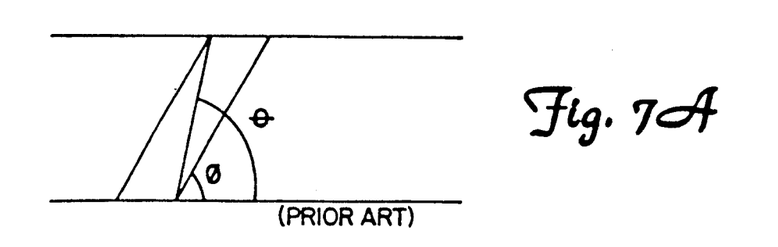
FIG. 7a illustrates two important track angles with the tape moving at full speed in prior art apparatus.
Figure 7B:
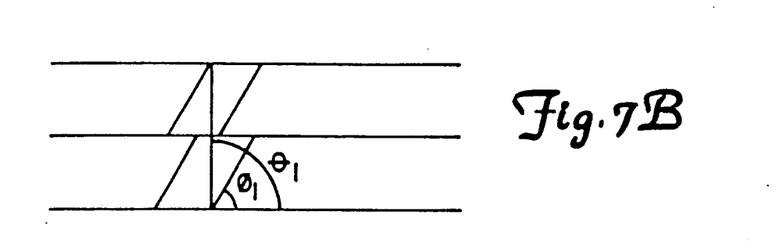

Now that the parts comprising the present apparatus have been described, some further description of the swipe synchronizer 505 is in order. The purpose of the swipe synchronizer is to record two or more subtracks, offset longitudinally, on a tape, where the tape is travelling at less than full speed, such that the recorded subtracks approximate a full track which is recorded at full tape speed. To explain the approximation, reference is made to FIGS. 7a and 7b. Thereshown is a full speed track recorded using the prior art method and a pair of subtracks 5 recorded at ½ speed. Note that the angle $\phi$ for a full tape speed track is greater than the angle $\phi_1$ for a track at less than full tape speed. In order to approximate the full speed track, $\theta$ must closely match $\theta_1$. This is done by carefully selecting the head used to record each subtrack.

Figure 8:
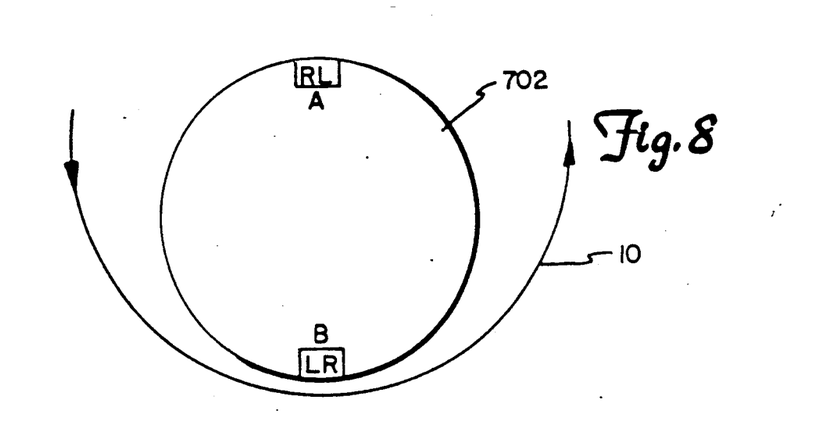
FIG. 8 is a diagram of a rotary scanner used in one embodiment of the present invention corresponding to the head configuration and tracks of FIGS. 5b and 5d.
Figure 9:
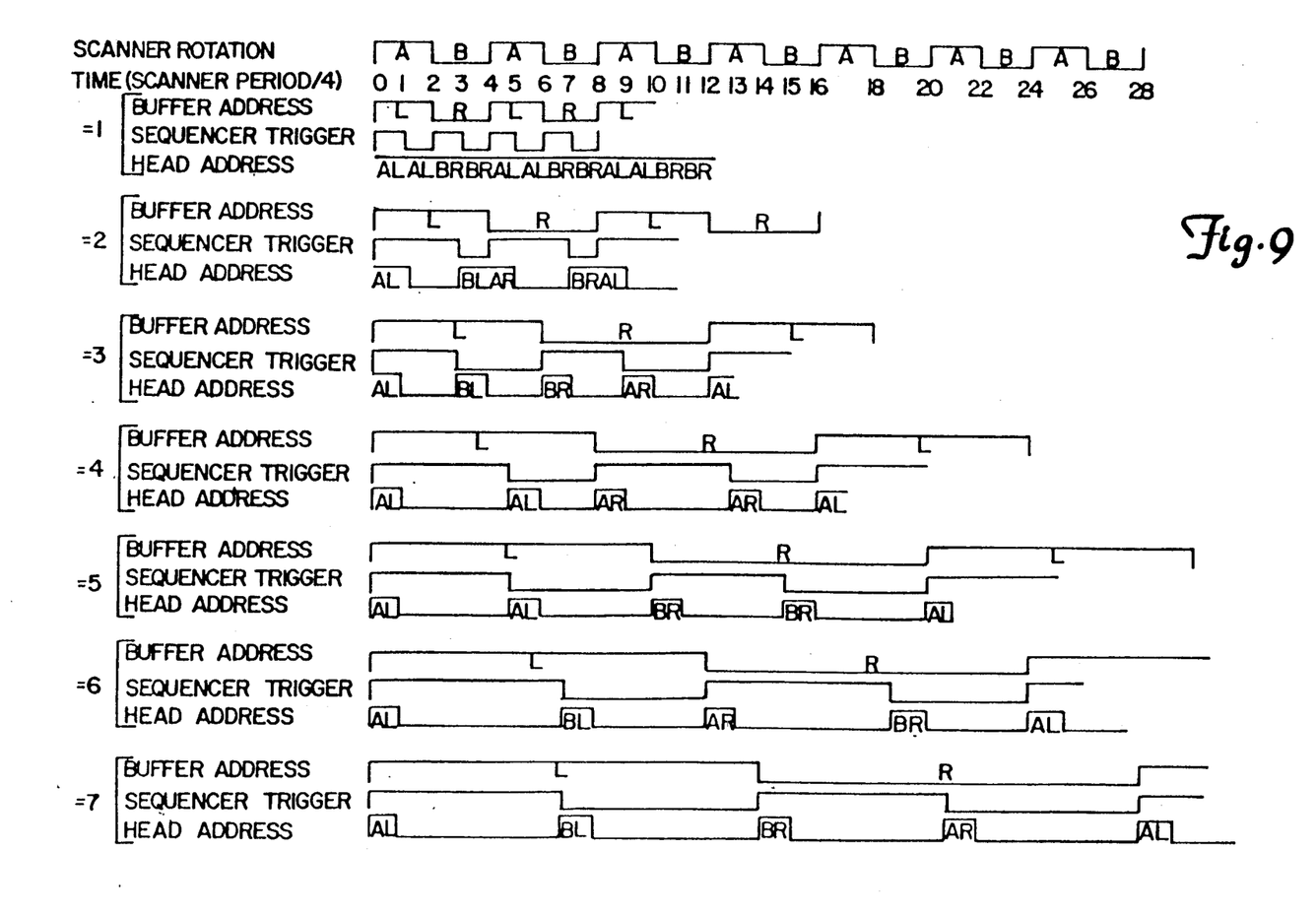
FIG. 9 shows the relationship of some of the signals generated in apparatus according to the present invention.

The swipe synchronizer 505 receives a number of signals which allow it to produce signals which control the head which is enabled. In FIG. 8, thereshown is one embodiment for a rotary rotary scanner 702 having head pair A and head pair B. Each head pair is comprised of a right head (R) and a left head (L). The rotary rotary scanner 702 rotates at a constant rate, for example 60 revolutions per second and has a constant period = 1/60 second for any tape speed. Swipe synchronizer 505 receives signals indicative of the tape speed and the scanner rotation rate. As a result, the swipe synchronizer 505 produces a head address signal, a sequence trigger signal and a buffer address signal. The relationship among these signals is shown in FIG. 9. Note that in FIG. 8, N is used to represent tape speed, i.e., tape speed=

$$\frac{\text{full speed}}{N}$$

For the head enable signal, the head (i.e., AL, BL, AR, BR) which appears under a high signal level in FIG. 9 is the head which is used to record in the write mode or read in the read mode.

Operation of the tape recorder during playback is slightly different than operation during recording. During playback, the heads 532 are left "on" at all times. That is all the heads are free to have a signal induced therein whenever the heads pass near the tape. However, a head is only selected to transmit the signal induced therein through the tape recorder to the signal utilization apparatus, such as a speaker, video display, or digital data processor only at certain times. The head which is selected to transmit the signal induced therein back to the utilization apparatus is the same head which would be used to record at the same speed.

We claim:

1. A method of recording data onto tape which may move longitudinally at any of a plurality of speeds by means of recording/reproducing apparatus of the type employing a rotary scanner having at least two heads spaced from one another around the circle in which they travel, comprising the steps of:

storing sequences of D data bytes where D is an integer;

dividing each of said sequences of D data bytes into W partial sequences of D/W data bytes each;

selecting a head for recording a subtrack which forms part of a recorded track across the tape, said track being formed of W subtracks and containing D data bytes, each subtrack containing D/W data bytes, said subtracks being located on the tape so as to maximize overlap of individual subtracks with the location of the track which would have been recorded at full tape speed by a single head, the selection being based on tape speed and rotary scanner speed.

2. The method of claim 1 including the additional step of formatting the partial sequence of D/W data bytes for recording onto the tape by adding to each partial sequence a preamble, a sync signal, and a postamble.

3. Apparatus for recording information on magnetic tape as a plurality of subtracks forming a complete track across the tape and for reproducing information so recorded, comprising:

tape drive means for moving the tape longitudinally, said tape drive means being adapted to selectively move the tape at full speed and integral fractions thereof;

a plurality of heads moving transverse to the direction of tape movement for recording information in tracks across the magnetic tape reproducing information so recorded;

head selection means operating in response to a timing signal to selectively enable individual heads to record or reproduce information in the separate subtracks;

timing means for producing the timing signal in coordination with tape speed so that the plurality of subtracks are each located for maximum overlap, at any tape speed less than full speed with the track which would have been recorded at full tape speed by a single head.

4. The apparatus of claim 3 wherein said plurality of heads is carried on a rotary scanner which rotates the heads at a constant speed independent of tape speed.

5. The apparatus of claim 4 wherein said head selection means includes multiplexer means responsive to the timing signal for routing information to be recorded to said plurality of heads and for accepting reproductions of recorded information from said plurality of heads.

6. The apparatus of claim 5, further comprising means for formatting the information prior to recording it on the magnetic tape by representing blocks of the information by sequences of D data bytes, adding sync, preamble, and postamble signals and splitting the sequences of D data bytes into W partial sequences of D/W data bytes each.

7. The apparatus of claim 6 wherein said means for formatting is further adapted to receive information in the form of an induced signal from said heads and filtering out any sync, preamble or postamble signal components.

8. The apparatus of claim 7 wherein said plurality of heads includes four heads, each having a face formed of a pair of pole pieces separated by an air gap which passes in close proximity to the magnetic tape.

9. The apparatus of claim 8 wherein:

a pair of said plurality of heads are recording heads whose faces have a width dimension L; and a pair of said heads are reproducing heads whose faces have a width dimension of one half L.

10. The tape recorder of claim 8, wherein:

the air gaps in a first pair of said plurality of heads is oriented at a first angle relative to the direction of movement of said plurality of heads across the magnetic tape; and the air gaps in a second pair of said plurality of heads is oriented at a second angle different from the first angle relative to the direction of movement of said plurality of heads across the magnetic tape.

11. The apparatus of claim 5 wherein said timing means is a programmable array logic device operable to selectively enable said heads in accordance with a signal indicative of tape speed.

12. In apparatus for recording signals on longitudinally moving tape and/or reproducing recorded signals therefrom by means of heads adapted to spin in a circular path in a plane transverse to the direction of longitudinal tape movement so that the heads make side by side swipes across the tape along the length thereof during which signals may be recorded in or reproduced from corresponding tracks across the tape, means for achieving improved reproduction of signals recorded and reproduced at different longitudinal tape speeds resulting in different swipe angles of the heads relative to the tape, comprising:

activation means for activating the heads so that, for each complete track of recorded or reproduced signals, the corresponding swipe is formed of a plurality of swipe segments during each of which a selected head is activated, the swipe segments having predetermined offsets from one another along the tape for longitudinal tape speeds other than the maximum tape speed, the activated head being the head whose swipe during the swipe segment most closely coincides with the swipe which would have been made at the maximum tape speed.

13. The apparatus of claim 12 wherein said activation means comprises:

a tape speed controller for causing movement of the tape at a selected longitudinal speed;

a buffer for storing information to be recorded or reproduced and for producing or accepting sequences of signals representing blocks of the information, each sequence of signals corresponding to one complete track across the tape;

sequence splitting means for separating each sequence of signals into a number of partial sequences corresponding to the number of swipe segments forming a complete swipe; and multiplexer means for routing each partial sequence of signals to or from an individual head determined by the tape speed set by said tape speed controller.

14. The apparatus of claim 13 including at least two pairs of heads equally spaced from one another around the circular path in which they are adapted to spin, the heads in each pair having distinct configurations for reducing responsiveness of the heads reproducing signals from a particular track to recorded tracks adjacent said particular track, thereby reducing the spacing required between adjacent tracks.

15. The apparatus of claim 14 wherein:

the signals are digital data signals, with each sequence of signals including a predetermined number of data bytes; and said sequence splitting means separates each sequence of signals into partial sequences of data bytes, each including the number of data bytes in a sequence of signals divided by the number of recording heads.

16. The apparatus of claim 15 wherein the recording and reproducing heads are configured so that the recording heads have a width approximately one half the width of the recording heads.

17. The apparatus of claim 15 wherein:

the heads each have a face formed of a pair of magnetic pole pieces separated by an air gap in which a variable magnetic field corresponding to the signal to be recorded or reproduced is formed; and the air gaps of alternate recording heads have different angular orientations with respect to the angle of the swipe followed by the heads, and alternate reproducing heads have air gaps with different angular orientations with respect to the swipe direction of the heads, the angular orientations of the air gaps of the reproducing heads corresponding to the angular orientations of the air gaps of the recording heads.

* * * * *